Feb. 23, 1971    R. D. KAHN    3,566,350
AUTOMOTIVE TAMPER ALARM
Filed March 27, 1968
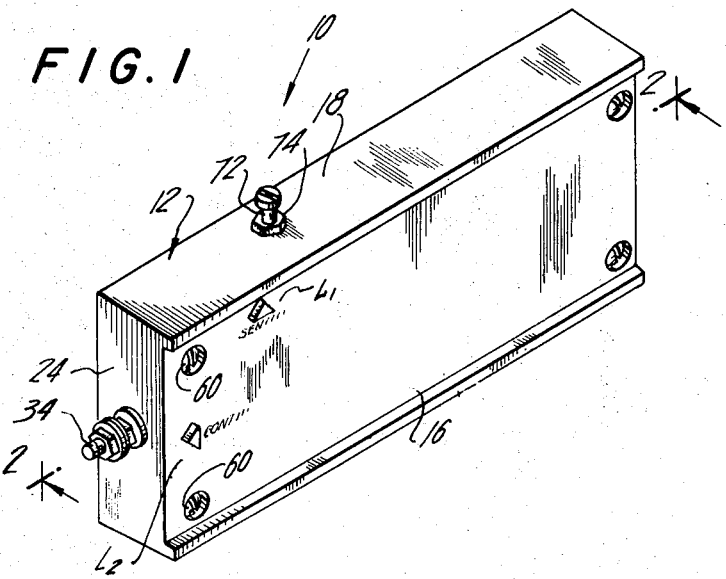
FIG. 1
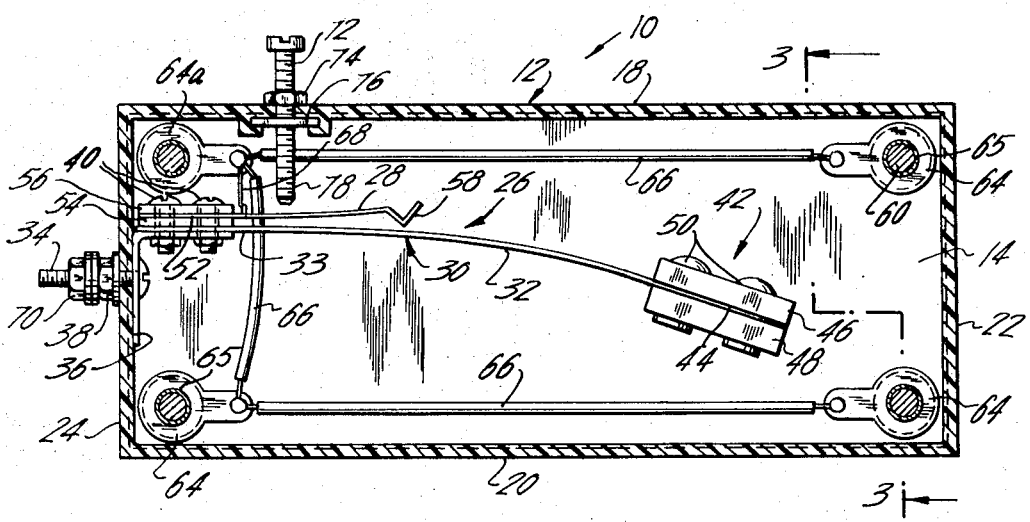
FIG. 2
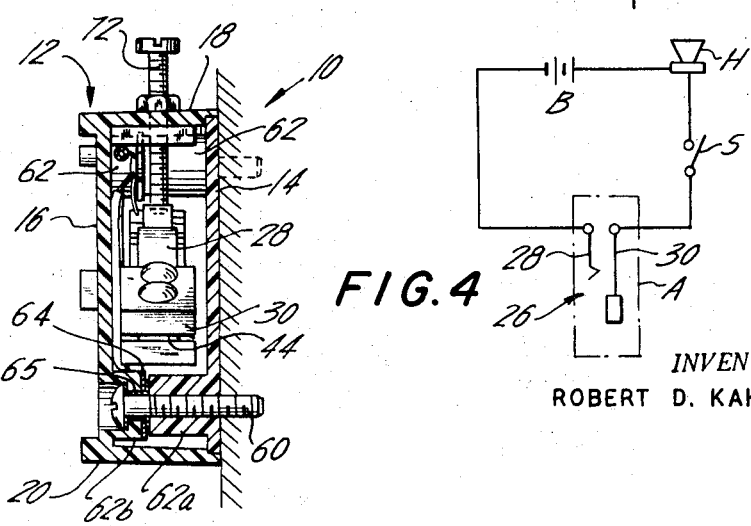
FIG. 3
FIG. 4
INVENTOR.
ROBERT D. KAHN

United States Patent Office 3,566,350
Patented Feb. 23, 1971

3,566,350
AUTOMOTIVE TAMPER ALARM
Robert D. Kahn, Rockville Centre, N.Y., assignor to Fedtro, Inc., Rockville Centre, N.Y., a corporation of New York
Continuation-in-part of design application Ser. No. 10,516, Feb. 9, 1968, now Patent No. 214,468. This application Mar. 27, 1968, Ser. No. 716,582
Int. Cl. B60r 25/00
U.S. Cl. 340—65                                    1 Claim

ABSTRACT OF THE DISCLOSURE

An alarm connected to an automobile to sound an alarm signal when tampering takes place with the automobile. The alarm includes a casing containing a switch with a pair of contacts, one of the contacts comprising an elongated flat spring arm. When the automobile is tampered with, the alarm will move causing the spring contact to vibrate and, in its movement, close with the other contact to complete an alarm circuit.

---

This is a continuation-in-part of application Ser. No. D. 10,516, filed Feb. 9, 1968, now Pat. No. D. 214,468, entitled Automotive Alarm.

This invention relates to an automotive alarm adapted to sound a warning signal when the automobile in which the alarm is mounted, is tampered with.

It is the primary object of the present invention to provide an automotive alarm adapted to sound a warning signal whenever the automobile on which it is mounted is tampered with, as for example by children performing mischief in connection with the automobile, by a person wrongfully starting the automobile engine or by a thief attempting to steal the automobile.

It is a further object of the present invention to provide an automotive alarm of the type described which utilizes a spring contact arm supported on one end, weighted on the other end, and adapted to vibrate when the automobile is jostled, the aforesaid contact arm being especially sensitive to even slight movements of the automobile.

It is still a further object of the present invention to provide an automotive alarm of the type described which includes a sensitivity-adjusting member so that the degree of sensitivity of the alarm to vibrations of the car can be set easily by the car owner to a desired level.

It is still another object of the present invention to provide an automotive alarm of the type described which is simple in construction, few in its number of parts, reliable in use over an extended period of time, and which will yet supply the necessary protection to prevent tampering with the automobile.

In general, the alarm includes a casing and a switch within the casing. The switch comprises two contact members, and circuit means connects the switch in series with the automobile battery and a noise-emitting device, such for example as the automobile horn, so that when the switch is closed, the noise-emitting device will be energized to sound a loud alarm. The switch, as has been said, comprises a pair of contact members, and one of the contact members includes an elongated flat spring arm supported on one end in the casing and carrying a weight at its other end. The spring extends arcuately generally horizontally so that the weight on one end keeps the spring under tension. When the alarm is moved or vibrated in any manner, the motion thereof will be transmitted through it to the spring arm and the spring arm will vibrate upwardly and downwardly through an arc of movement. The other contact member of the switch is spaced immediately above the arm so that when the spring upwardly, it closes with the upper contact member to close the circuit. As the spring arm continues to vibrate upwardly and downwardly periodically, it will periodically close the switch, periodically energizing the sound-emitting device to give out a periodic loud alarming sound. A sensitivity-adjusting member permits the upper contact member to move more distantly from or moves the member closer to the other, lower contact member thereby to adjust the sensitivity of the alarm.

The above description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a front perspective view of an automotive alarm constructed in accordance with the principles of the present invention;

FIG. 2 is an enlarged vertical cross sectional view taken substantially along the line 2—2 of FIG. 1;

FIG. 3 is a vertical cross sectional view taken substantially along the line 3—3 of FIG. 2; and FIG. 4 is a schematic circuit diagram for the automotive alarm.

Referring now in detail to the drawings, the automotive alarm 10 of the present invention includes a casing 12 closed by a flat cover 14. The casing 12 includes a back wall 16 parallel to the cover 14, upper and lower parallel walls, respectively, 18, 20 and parallel side walls 22, 24, the walls 18 through 24 being integral with the back wall 16. The walls 16 through 24 and the cover 14 form an internal cavity in the alarm 10 within which other components of the alarm are mounted.

The alarm 10 further includes a normally open switch 26 mounted within the casing 12. The switch includes a pair of contact members, an upper contact member 28 and a lower contact member 30. The lower contact member 30 includes an elongated metal spring arm 32 of a length many times greater than its uniform width. The arm 32 is mounted on one of its ends 33 adjacent the side wall 24 of the casing 12. More specifically, a bolt 34 passes through an aperture in one arm of an L-shaped rigid metal support bracket 36 mounted against the interior face of the side wall 24, passes through an aperture in said side wall 24 and is held by a nut 38 rigidly in place. The bracket 36 mounts on its other arm, the end 33 of the spring arm 32, and the end is fixed to the upper arm of the bracket 36 by a pair of bolts 40.

A weight 42 is fixed to the other, free end 44 of the spring arm 32 and, more specifically, the weight 44 includes an upper weight member 46 and a lower weight member 48, the end 44 being sandwiched between the weight members 46, 48 which are retained in place by a pair of rivets 50 passing through both the weight members and the end. It will be seen that the spring arm 32 is essentially horizontal in its orientation and slightly arcuate, i.e., upwardly convex. The spring arm is maintained by the weight 44 in a state of tension. Due to the weight 42 combined with the length of the spring arm 32 positioning the weight distantly from the stationary end 33 of the spring arm and adjacent the side wall 22, any motion imparted to the casing 12 will impart similar motion to the spring arm 32, and by virtue of the weight, the spring arm 32 swings in an arc upwardly and downwardly in a pendulum-like manner.

The upper contact member 28 is mounted vertically directly above the lower contact member 30, and it thus in alignment therewith. More specifically, the contact member 28 comprises a somewhat elongated spring and one of its ends 52 is located adjacent the horizontal arm of the bracket 36 and is separated from the end 33 of the spring arm 32 by insulation 54. The heads of the bolts 40 are separated from the end 52 of the upper contact member 28 by insulation 56. It will be apparent that the bolts 40 and the bracket 36 serve to mount the ends of both contact members 28, 30 in a stationary manner, and that the upper contact member 28 is carried by the lower contact member 30.

The free end 58 of the contact member 28 is of V-shaped configuration and is, in repose, distant from the contact member 30. When the spring arm 32 swings upwardly and downwardly, it swings toward and away from the contact member 28 and when it moves upwardly to a sufficient extent, it makes contact with the upper contact member 28 at the lower-most tip of the V-shaped end 58 thereby closing the switch 26. The V-shaped end 58 contacts the spring arm 32 at a middle portion thereof. As the spring arm continues to swing upwardly and downwardly it periodically closes the switch 26.

The alarm 10 is mounted on an automobile, as for example on an automobile dash, by four elongated bolts 60 which pass through apertures in mating pairs of bosses 62 formed both internally on the cover plate 14 and internally on the back wall 16. Exemplicatively, mating bosses 62a, 62b are seen in FIG. 3. Terminals 64 are mounted between mating bosses 62. The terminals 64 are apertured and are retained in place by grommets 65, each grommet extending from a terminal to an enlarged diameter portion of the aperture in a boss carried by the back wall 16. Accordingly, when the bolts 60 are inserted into the apertures (from the back wall 16 toward the cover 14) the head of each bolt makes electrical contact with a grommet 65 and thus a terminal 64 surrounding the aperture through which it passes. As will be seen in FIG. 2, the terminals 64 are connected in series by lead lines 66 and a lead line 68 runs from a common terminal 64a to the upper contact member 28.

FIG. 4 shows a circuit diagram for the automotive alarm. The casing of the alarm is indicated by the dot and dash lines A within which the contact members 28, 30 are situated. The contact members 28, 30, comprising the switch 26, are connected in series with the automobile battery B, a sound-emitting device H such as the horn of the automobile, and with a conventional "on-off" toggle switch S. When it is desired to place the alarm into an operating mode, the toggle switch S is closed so that when the contact members 28, 30 close, the horn H will be energized.

The aforesaid connections from the switch 26 of the alarm 10 to automobile battery B, horn H and switch S are entirely conventional and can be easily carried out by a "do-it-yourself" car owner. As seen in FIG. 2, the bolt 34 carries an additional nut 70, so that a terminal lug of a lead line (not shown) may be captured between the nuts 38, 70. The bolt 34 is indicated by an appropriate legend and by an arrow head on the back wall 16 as at $L_2$. Thereby, connection is made to the contact member 30. As has been described previously, the bolts 60 which pass through the casing 12 electrically connect the terminals 64 and thus the upper contact member 28 to a portion of the automobile chassis, conventionally grounded.

Alternatively, other lead lines may be connected to these bolts 60.

Means is provided to adjust the sensitivity of the alarm 10. To this end, a member 72 mounted on the casing 12 vertically over the contact member 28 is adapted to position the contact member 28 at various locations more closely adjacent the contact member 30. This member is indicated by an arrow head and an appropriate legend on the back wall 16 as at $L_1$. The member 72 comprises an elongated bolt retained in a desired position on the casing wall 18 by a nut and a nut plate, respectively, 74, 76. The head of the bolt is exposed externally of the casing. It will be apparent that if the bolt 72 is rotated in one direction, its end 78 situated within the casing 12 will move toward the contact member 28 and if rotated in the opposite direction, its end 78 will move away from the contact member 28. When the end 78 is completely free of the contact member 28, the contact member 28 is spaced from the contact member 30 by the action of the weight 42 on the spring arm 32 and due to the positioning of the contact member 28 which, as has been said, is also formed from a flat spring. This spacing is such that only vibrations sufficient to cause relatively substantial movement of the spring arm 32 will set off the alarm. If it is desired to make the alarm more sensitive to vibrations, the member 72 is rotated so that the end 78 contacts the member 28 and moves it downward toward the member 30 to a slight extent. This causes the V-shaped end 58 of the contact member 28 to simultaneously be moved toward the contact member 30 lessening the gap in between the contact members. Accordingly, a lesser vibration applied to the automobile which causes a lesser vibration of the contact member 30 will set off the alarm. Hence, it is apparent that the sensitivity of the alarm 12 can be readily adjusted by upward or downward movement of the member 72.

A latitude of modification, change and substitution is intended in the foregoing disclosure and in some instances some features of the invention will be employed without a corresponding use of other features. Accordingly, it is appropriate that the appended claim be construed broadly and in a manner consistent with the spirit and scope of the invention herein.

I claim:

1. An alarm for an automobile for emitting a warning signal by energizing a noise-emitting device when the automobile is tampered with, the alarm comprising a casing, a switch carried within the casing and including first and second contact members in aligned normally open relationship, the first contact member including an elongated spring arm supported at one end thereof in the casing and a weight fixed to the elongated arm at the other end thereof, the second contact member comprising an elongated flat spring with a V-shaped end portion, the arm of the first contact member being adapted to vibrate toward and away from the second contact member to contact the V-shaped end so as to periodically close the switch, circuit means carried by the casing in series with said switch and adapted to be connected to a source of electrical energy and to a noise-emitting device so that when the switch is closed, the noise-emitting device is energized, and a sensitivity member situated on the casing over the second contact member mounted to move between a position clear of said contact members and a position urging the contact members toward one another, the casing including a cover, the casing including several bosses formed internally thereof and the cover including several bosses formed internally thereof, the bosses on the casing mating with the bosses on the cover, each of said bosses defining a mounting aperture adapted to receive a bolt and the circuit means includes a number of terminals, each terminal being situated over an aperture within a boss and including a conductive portion thereof situated at an exposed portion of the aperture so that when a bolt is placed therein, contact is made between the bolt and a terminal, all of said terminals being connected to one of the contact members, and a number of bolts passing through mating pair of bosses to thereby hold the casing to the cover, to hold the casing and cover to the automobile, and to electrically connect the circuit means to the automobile chassis.

References Cited

UNITED STATES PATENTS

| | | | | |
|---|---|---|---|---|
| 2,885,504 | 5/1959 | Yurtz | | 340—65X |
| 3,160,868 | 12/1964 | Kowanda | | 340—65X |
| 3,268,701 | 8/1966 | La Plante et al. | | 200—166 |
| 3,284,584 | 11/1966 | Didyk | | 200—166X |
| 3,308,250 | 3/1967 | Field et al. | | 200—166X |

ALVIN H. WARING, Primary Examiner

U.S. Cl. X.R.

200—42, 168